United States Patent [19]
Chatterjee et al.

[11] Patent Number: 6,156,246
[45] Date of Patent: *Dec. 5, 2000

[54] INJECTION MOLDING OF FINE CERAMICS

[75] Inventors: Dilip Kumar Chatterjee; Syamal Kumar Ghosh; William Joseph Hutchinson, all of Rochester, N.Y.

[73] Assignee: Eastman Kodak Company, Rochester, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/960,670

[22] Filed: Oct. 30, 1997

Related U.S. Application Data

[63] Continuation of application No. 08/736,849, Oct. 28, 1996, abandoned.

[51] Int. Cl.[7] .................................................. B29B 9/00
[52] U.S. Cl. ................................ 264/5; 264/12; 264/645
[58] Field of Search ................................ 264/5, 12, 645

[56] References Cited

U.S. PATENT DOCUMENTS

| | | | |
|---|---|---|---|
| 4,430,279 | 2/1984 | Hagio et al. | 264/65 |
| 4,624,812 | 11/1986 | Farrow et al. | 264/63 |
| 4,704,242 | 11/1987 | Bandyopadhyay et al. | 264/234 |
| 5,155,158 | 10/1992 | Kim | 524/424 |
| 5,248,463 | 9/1993 | Obitsu et al. | 264/63 |
| 5,248,464 | 9/1993 | Alford et al. | 264/63 |
| 5,250,251 | 10/1993 | Fanelli et al. | 264/328.2 |
| 5,258,155 | 11/1993 | Sekido et al. | 264/109 |
| 5,290,332 | 3/1994 | Chatterjee et al. | 65/18.1 |
| 5,326,518 | 7/1994 | Kimura et al. | 264/63 |
| 5,336,282 | 8/1994 | Ghosh et al. | 51/309 |
| 5,358,913 | 10/1994 | Chatterjee et al. | 501/103 |
| 5,380,179 | 1/1995 | Nishimura et al. | 419/36 |
| 5,427,721 | 6/1995 | Brezny et al. | 264/44 |
| 5,449,646 | 9/1995 | Zank | 501/92 |

OTHER PUBLICATIONS

Principles of Ceramic Processing, Second Edition, Wiley Interscience, pp. 54–58 and pp. 477–482, 1995.

*Primary Examiner*—Christopher A. Fiorilla
*Attorney, Agent, or Firm*—Edward Dugas; Clyde E. Bailey, Sr.

[57] ABSTRACT

An improved method for injection molding fine particulate inorganic materials that first spray dries a fine particulate inorganic material and then mixes the dried particulate inorganic material with a binder system to form a compounded material. The compounded material is then injected, at a low pressure into a mold to form a green part. The green part is then debinded to remove most of the binder system and the debinded green part is then sintered to form the final molded part.

2 Claims, 2 Drawing Sheets

6,156,246

INJECTION MOLDING OF FINE CERAMICS

This is a Continuation of application Ser. No. 08/736,849, filed Oct. 28, 1996, abandoned.

FIELD OF THE INVENTION

This invention relates generally to the field of injection molding of inorganic materials and more particularly to low pressure injection molding of particulate zirconia, its composites, and other particulate ceramics for manufacture of low cost, high precision, and complex shaped parts.

BACKGROUND OF THE INVENTION

Experience indicates that ytrria-doped tetragonal zirconia polycrystal (Y-TZP) ceramic materials offer many advantages over conventional materials. Y-TZP is one of the toughest ceramics. The toughness is achieved at the expense of hardness and/or strength. A tetragonal zirconia alloy-alumina composite, that is, the product of sintering a particulate mixture of zirconia alloy and alumina, is another tough and relatively soft structural ceramic composite. Tetragonal zirconia polycrystal (TZP) ceramics and its composites are characterized by their high strength, high fracture toughness, superior wear, and abrasion resistances. Because of their attractive properties, these materials are suitable candidates for high precision punch, die, slitter knives, hydro-dynamic bearings, and machine components. Unfortunately, the manufacturing processes for these ceramics are difficult and are very costly primarily because of labor intensive machining processes to produce high precision complex shaped parts. Injection molding, however, is a technique which can be successfully utilized to manufacture large volumes of complex shaped parts in a cost effective way. Injection molding of inorganic powders with very fine particulate size, such as zirconia, and a wide variation in particle size such as in composites, pose a multitude of manufacturing problems, and the novelty of our invention relates to overcoming a plurality of manufacturing problems. In order to produce TZP, pure zirconia needs to be alloyed with a stabilizing agent(s), and the crystallite size needs to be maintained at a submicron level, preferably at or below 0.3 $\mu$m. The composite ceramic materials of interest to this invention are composites of zirconia or alumina with either oxide or non-oxide inorganic particulates. Some of the examples of the composites in this invention are $ZrO_2$—$Al_2O_3$, $ZrO_2$—$TiB_2$, $ZrO_2$—$SiC$, $ZrO_2$—$Si_3N_4$, $ZrO_2$—$AlN$, $Al_2O_3$—$ZrO_2$, and other composites primarily based on inorganic oxides, carbides, nitrides, borides, and silicides. In the case of composites, the particle size distribution between the components of the composites normally have a wide range of variation.

Prior art searching in the field of injection molding of inorganic materials indicates that the inorganic materials normally have a narrow range of variation in their particle size distribution; injection pressure, temperature, and velocity are normally very high.

The prior art also fails to teach the use of ceramic composites having a wide variation of particle sizes in a low pressure, low temperature, and low velocity injection molding process.

SUMMARY OF THE INVENTION

The present invention is directed to overcoming one or more of the problems set forth above. Briefly summarized, according to one aspect of the present invention there is provided a method for injection molding fine particulate inorganic materials comprising the steps of:

a) spray drying the fine particulate inorganic material;

b) mixing the spray dried particulate inorganic material with a binder system to form a compounded material;

c) injecting the compounded material at low pressure into a mold to form a green part;

d) debinding the green part to remove most of the binder system; and e) sintering the debinded green part to form the final molded part.

In general, the present invention is directed to low pressure injection molding of inorganic materials and its composites either with a narrow particle size distribution or with a wide range of particle size distribution. This invention also deals with the use of low pressure to inject the material in an inexpensive mold, elimination of molding defects (e.g. weld lines) due to use of low injection velocity, and low injection temperature.

These and other aspects, objects, features, and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantages:

1. It provides a cost effective method for manufacturing "net" or "near-net" shape parts/components.
2. It makes large volume production of ceramic parts feasible.
3. Low initial tooling costs due to the low pressure requirements.

BRIEF DESCRIPTION OF THE DRAWINGS

To facilitate understanding, identical reference numerals have been used in the drawings, where possible, to designate identical elements that are common to the figures.

DETAILED DESCRIPTION OF THE INVENTION

Figure 1:
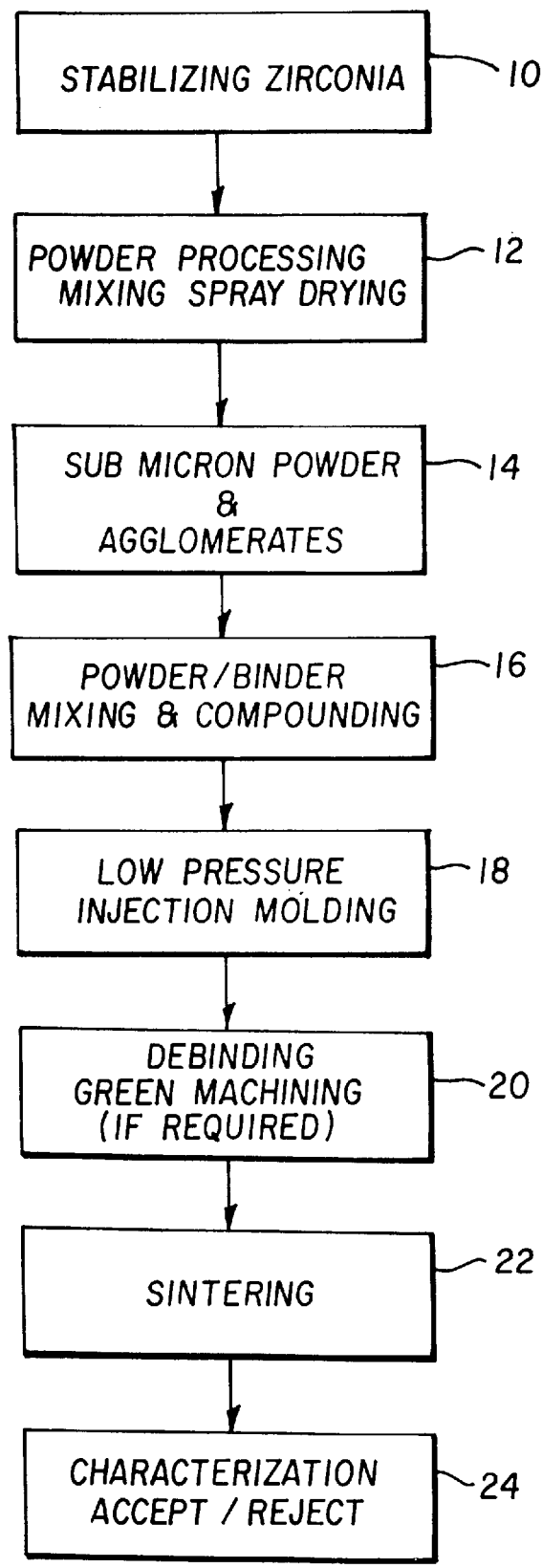
FIG. 1 is a schematic flow diagram illustrating the steps of the method of the invention.

In the method of this invention, broadly illustrated in FIG. 1, a ceramic powder, zirconium oxide (zirconia) alloy, or a mixture of particulate zirconium oxide (zirconia) alloy, and a second concentration of aluminum oxide (alumina) is used for making ceramic injection molded articles, as discussed fully below.

The method commences with block 10 calling for a stabilization of the zirconia. Initially zirconia is stabilized by alloying with a selected chemical species. The zirconium oxide alloy consists essentially of zirconium oxide and a secondary oxide selected from the group consisting of MgO, CaO, $Y_2O_3$, $Sc_2O_3$, and rare earth oxides. Moreover, the zirconium oxide alloy has a concentration of the secondary oxide: in the case of $Y_2O_3$, of about 0.5 to about 5 mole percent; in the case of MgO, about 0.1 to about 1.0 mole percent; in the case of $CeO_2$, about 0.5 to about 15 mole percent; in the case of $Sc_2O_3$, about 0.5 to about 7.0 mole percent; and in the case of CaO from about 0.5 to about 5 mole percent, relative to the total moles of said zirconium oxide alloy.

Ceramic Powder Material Mixing

Zirconia alloys are available commercially. For example, particulate zirconia alloy having 3 mole percent $Y_2O_3$ is marketed by Z-TECH Corporation, Bow, New Hampshire, as "SYP-ULTRA 5.2 Yttria Stabilized Zirconia" or by TOSHO Corporation of Japan, as "TZ-3YB."

One of the preferred materials which we use in the method of this invention is a zirconia powder having 100% tetragonal crystal structure. This 100% tetragonal zirconia is formed by alloying zirconia with a number of secondary oxides as taught by two of the named inventors of this application in U.S. Pat. No. 5,336,282, entitled, "Zirconia Ceramics and a Process of Producing the Same," by Ghosh, et al, and U.S. Pat. No. 5,358,913, entitled, "Zirconia Ceramic Articles Having A Tetragonal Core and Cubic Casing," by Chatterjee et al.

Another preferred ceramic powder mixture that was successfully used in the method of making zirconia-alumina composites of the invention includes a particulate zirconia alloy and a particulate alumina made by mixing $ZrO_2$ and additional "secondary oxide" selected from MgO, CaO, $Y_2O_3$, $Sc_2O_3$, $Ce_2O_3$, and other rare earth oxides (also referred to herein as "Mg—Ca—Y—Sc-rare earth oxides") and then with $Al_2O_3$. zirconia alloys useful in the methods of the invention have a metastable tetragonal crystal structure in the temperature and pressure ranges at which the ceramic article to be produced will be used. For example, at temperatures up to about 200° C. and pressures up to about 1000 MPa, zirconia alloys having a concentration of secondary oxide, in the case of $Y_2O_3$, of about 0.5 to about 5 mole percent; in the case of MgO, about 0.1 to about 1.0 mole percent; in the case of $CeO_2$, about 0.5 to about 15 mole percent; in the case of $Sc_2O_3$, about 0.5 to about 7.0 mole percent; and in the case of CaO, from about 0.5 to about 5 mole percent, relative to the total moles of said zirconium oxide alloy, and exhibit a 100% tetragonal structure. Preferred oxides for alloying with zirconia are $Y_2O_3$, MgO, CaO, $Ce_2O_3$, and combinations of these oxides. It is preferred that the zirconia powder have high purity, greater than about 99.9 percent. Specific examples of useful zirconia alloys include tetragonal structure zirconia alloys having from about 2 to about 5 mole percent $Y_2O_3$ or more preferably about 3 mole percent $Y_2O_3$.

Examples of tetragonal structure zirconia alloys useful in the methods of the invention are disclosed in U.S. Pat. No. 5,290,332, entitled, "Ceramic articles and Methods For Preparing Ceramic Articles and For Sintering," by Chatterjee, et al. Such zirconia alloys are described in that patent as being useful to provide a "net-shape" ceramic article: a ceramic article that is dimensionally true after sintering and therefore does not necessitate further machining prior to use in its intended working environment.

The next step of the process, as represented by block 12, insures a uniformly distributed mixture. In the case of zirconia alloy this is achieved by spray drying. In the case of zirconia-alumina composites, this is achieved by mixing mechanically or chemically; for example, mixing by co-precipitation followed by spray drying. The particulate mixture thus formed is from about 50 to 99 percent by weight (weight/total weight of particulate mixture) $ZrO_2$, and preferably is from about 80 to about 99 percent by weight $ZrO_2$, or more preferably is from about 80 to about 95 percent by weight $ZrO_2$.

In the next step of the process, represented by block 14, the submicron powder or powder mixture from the preceding step is agglomerated. The agglomerate sizes and distributions, moisture contents, and binders (if any) can be varied in both the alumina and the zirconia alloy in a manner known to those skilled in the art. Agglomerate is defined as an aggregation of individual particles, each of which may comprise multiple grains. Grain is defined as an individual crystal, which may be within a particle, having a spatial orientation that is distinct from that of adjacent grains. In a particular embodiment of the invention, the grain and agglomeration sizes and distributions, and moisture contents of the alumina and the zirconia alloy are substantially the same and are selected as if the zirconia alloy was not going to be mixed with the alumina, i.e., in a manner known to the art to be suitable for the preparation of a zirconia alloy article.

An example of convenient particulate characteristics for a particular embodiment of the invention is the following: Purity of $ZrO_2$ is preferably well controlled at 99.9 to 99.99 percent; that is, impurities are no more than about 0.1 to 0.01 percent. The grain size is from about 0.1 micrometers to about 0.6 micrometers. The average grain size is 0.3 micrometers. The distribution of grain sizes is: 5–15 percent less than 0.1 micrometers, 40–60 percent less than 0.3 micrometers, and 85–95 percent less than 0.6 micrometers. The surface area of each individual grain ranges from about 10 to about 15 $m^2$/gram or is preferably 14 $m^2$/gram. Agglomerate size is from about 30 to about 60 micrometers and average agglomerate size is 40–60 micrometers. Moisture content is about 0.2 to 1.0 percent by volume and is preferably 0.5 percent. The particle size of alumina is 0.5 to 1.5 micrometers with the average being 1.0 micrometer.

In the next step, represented by block 16, binders such as paraffin wax, gelatin, polyethylene glycol (PEG), acrylic, polyvinyl ionomer, or polyvinyl alcohol, are added to and mixed with the particulate mixture Y-TZP or a composite mixture of Y-TZP and alumina. This can be achieved preferably by spray drying or ball milling (mixing) prior to the placement of the mixture in a compounding device.

Compounding, in which the particulate mixture or mixtures are mixed with greater than about 20% by weight of an organic binder such as paraffin at a temperature higher than the glass transition temperature of such binder for subsequent injection molding process. The preferred binder for use in this method is either paraffin wax and/or bees wax. The organic binder is mixed with other components (set out below) of the binder system in a rotary mixer. There are three components to the binder system in this invention: paraffin wax; and two processing aids, oleic acid and Neodol™ (a linear $C_{11}$ alcohol ethoxylate nonionic surfactant), which are added to a pre-heated (70° C.) mixing bowl. This mixture is stirred until the wax is completely melted. While continuously stirring the wax and other components of the binder system, the inorganic particulates or its mixtures are added to it at a rate that precludes lumping in the mixing bowl. The mixture is then allowed to stir for approximately 4 hours and then removed from the pot. It is preferable that this be done while the mix is still warm (for ease of handling). The compounded materials were allowed to rest for at least 8 hours before they were used for injection molding.

Injection Molding

Figure 2:
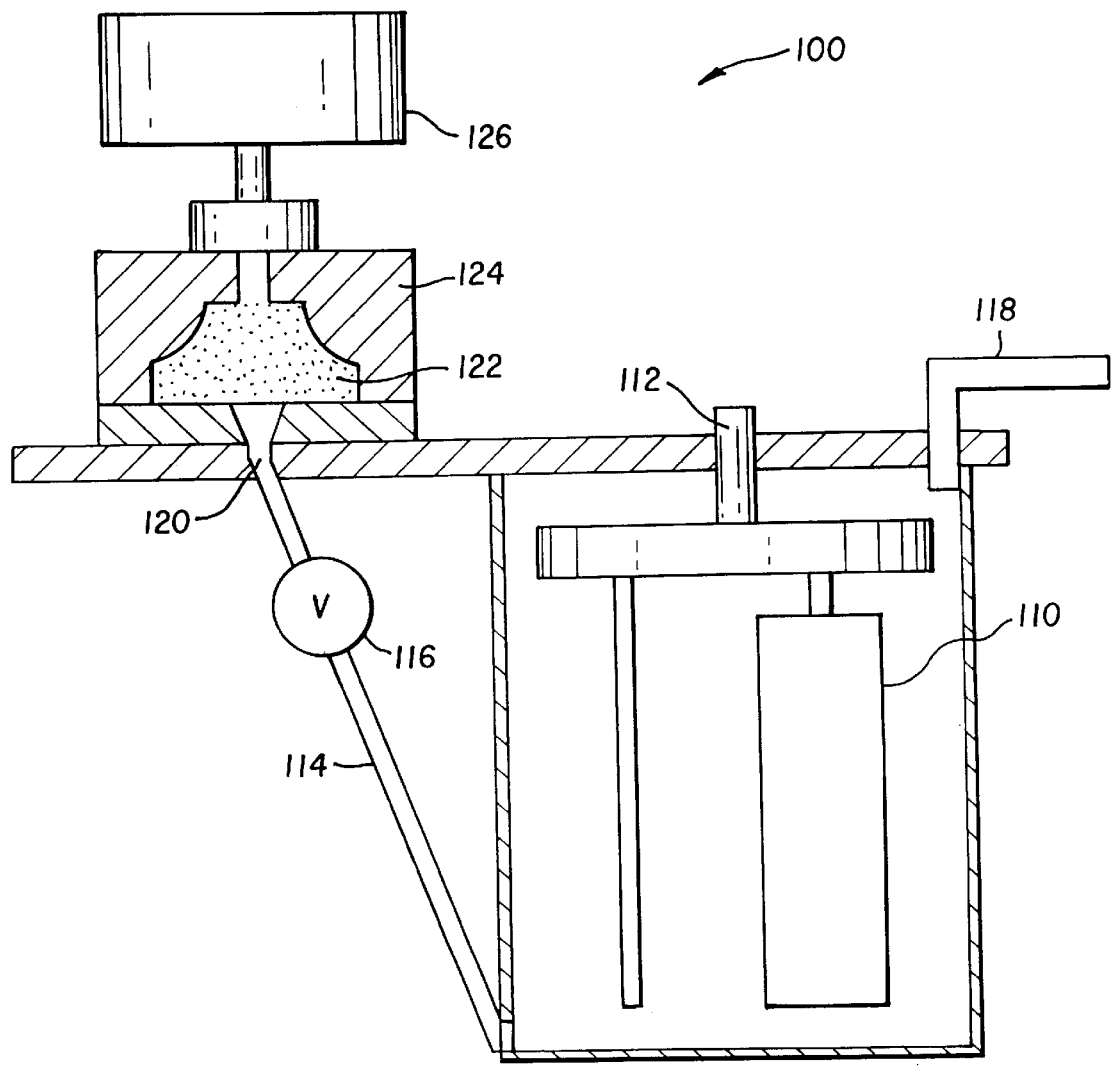
FIG. 2 is a schematic representation of a low-pressure injection molding machine used to implement the method of this invention.

FIG. 2 illustrates an apparatus 100 for performing the low pressure injection molding in the next step of the process represented by block 18 of FIG. 1. The apparatus 100 used to perform the following steps was a Peltsman, model MIGL-33. The compounded mixture of the inorganic particulates was placed in a pot 110 of the injection molding apparatus 100. The pot 110 is equipped with a motor driven mixer 112 and is pressurized via a port 118. The pot 110 is also heated with a well controlled electrical heater (not shown). The compounded mixture and inorganic particulates are transferred to a mold 124 via a transfer tube 114 and a ball valve 116. The ball valve 116 is regulated by a pneumatic transducer (not shown) which makes the ball valve 116 open or close on demand. As the compounded mixture (of ceramics or inorganic particulates) is pressurized in the pot 110, the material flows through the transfer tube 114 to the mold 124 to form the "green ceramic" article 122 when the ball valve 116 is opened. A clamping cylinder 126 maintains the compounded mixture within the mold. Injection of the compounded material into the mold 124 was made at a pressure of 10–70 psi for 20–40 seconds while keeping the pot temperature at around 80° C. and the transfer tube and its orifice 120 at a temperature around 85° C. The mold 124 was kept at ambient temperature. The mold was unclamped from the machine and allowed to cool and the "green ceramic" article 122 was taken out.

Debinding

In the next step of the process represented by block 20 in FIG. 1, the "green ceramic" article 122 is debinded at approximately 220° C. for 12 hours to remove the binder system. Complete removal of the binder system is not encouraged. Five percent of the binder originally used was allowed to remain in the green bodies. The temperature and the length of time the temperature is maintained in the debinding step is dependent on the type of binder used and on achieving the five percent remainder of binder in the green body. It is to be noted that some complex geometrical parts may require initial machining prior to the sintering process.

Sintering

The next step of the process, the sintering step, is represented by block 22 of FIG. 1. Sintering of the "green ceramic" article 122 is performed at a temperature range from about 1400° C. to about 1600° C., or more preferably about 1500° C. Preferable sintering times are in the range from about 1 hour to about 3 hours, or more preferably, about 2 hours. In a particular embodiment of the method of this invention, the sintering peak temperature is 1500° C. and that temperature is maintained for about 2 hours. It is preferred that the pre-sintered articles be slowly heated to sintering temperature and slowly cooled so as to avoid undesirable dimensional changes, distortions, and crack development. In an embodiment of the invention having a preferred sintering temperature of 1500° C., preferred temperature ramps during heating are: about 0.3° C./minute for room temperature to about 300° C.; about 0.1° C./minute for about 300° C. to about 400° C.; about 0.4° C./minute for about 400° C. to about 600° C; and about 1.5° C./minute for about 600° C. to about 1500° C. Preferred temperature ramps during cooling are: about 2° C./minute for about 1500° C. to about 800° C. and about 1.6° C./minute for about 800° C. to room temperature.

Alternatively, sintering of green bodies of $ZrO_2$—$Al_2O_3$ may be achieved in the presence of a dopant selected from the group of compounds, MgO, FeO, ZnO, NiO, and MnO, and combinations thereof, as discussed below in detail. The resulting zirconia-alumina ceramic composite article of the invention has a core of α-alumina and tetragonal zirconia and a case of cubic spinel or cubic spinel along with cubic structure or cubic and monoclinic or tetragonal structure of zirconia alloy. For zirconia alloy ceramic, sintering in the presence of a dopant selected from "Mg—Ca—Y—Sc-rare earth oxides" will produce articles with cores having tough tetragonal crystal structure and the cases having hard cubic crystal structure.

It is preferred that the sintering result in a ceramic article having a "full" or nearly theoretical density, and it is more preferred that the density of the ceramic article be from about 99.5 to about 99.9 percent of theoretical density. Sintering is conducted in air or other oxygen containing atmospheres.

The methods of the present invention are not limited to any particular sintering pressure and temperature conditions. Sintering can be performed at atmospheric pressure, or alternatively a higher pressure such as that used in hot isostatic pressing, which can be used during all or part of the sintering to reduce porosity. The sintering is continued for a sufficient time period for the case of the article being sintered to reach a thermodynamic equilibrium structure. An example of a useful range of elevated sintering pressures is from about 69 Mpa to about 207 Mpa, or more preferably about 100–103 Mpa.

The exact manner in which the dopant is in contact with the blank during sintering is not critical; however, the "case," as that term is used herein, is limited to those areas of the blank in contact with the dopant during sintering. For example, a cubic spinel and tetragonal zirconia case can be readily produced by the methods of the invention on a portion of the overall surface of an article. It is not critical that the dopant be in contact with the blank during initial sintering;

that is, sintering which does not result in an increase in density to full density.

The next step of the process is set out by block 24 wherein the part is either accepted or rejected based on the characterization which includes density measurement, X-ray diffraction, dimensional accuracy, and soundness of the part.

Prior to observing the results of the examples, the inventors had thought that they would be able to provide an explanation for conversion methods having any relative percentages of zirconia alloy and alumina. The inventors had expected results to be in accord with the concepts that the formation of cubic spinel is highly favored thermodynamically over the conversion of tetragonal zirconia to cubic zirconia and that the mechanism of action follows alumina concentration.

What has been discovered by the inventors is that, surprisingly, if the concentration of alumina in the zirconia-alumina composite (blank) is from about 5 weight percent (relative to the total weight of zirconia and alumina) to about 50 weight percent, then the method of the invention produces an article having a case that is cubic spinel and tetragonal zirconia and a core that is α-alumina and tetragonal zirconia. During sintering, dopant, in effect, diffuses past tetragonal zirconia until all of the dopant has contacted and reacted, i.e. "partitioned," with alumina. In contrast, if the concentration of alumina in the blank is less than about 5 weight percent or greater than about 75 weight percent, then the method of this invention produces an article that has a case that is substantially composed of cubic spinel and cubic zirconia or cubic and monoclinic zirconia and a core that is α-alumina and tetragonal zirconia. During sintering, the dopant does not, in effect, diffuse past tetragonal zirconia until all of the dopant has contacted and reacted with alumina, but rather reacts with alumina and tetragonal zirconia in the same vicinity, leaving alumina deeper within the blank unreacted.

These results are not compatible with a simple mechanism of action based on concentration alone. The results seen are compatible with a mechanism of action based upon an unpredictable alignment of several competing factors, such as rate of diffusion of dopant during sintering.

EXAMPLES

Working Example 1

Zirconia ceramic powder prealloyed with secondary oxides (as described in U.S. Pat. No. 5,336,282, and U.S. Pat. No. 5,358,913) were mixed with the binder system as described above (block 16).

Working Example 2

Same as in Working Example 1, except that the zirconia alloy powder is mixed with alumina from 5–50 wt %. This mixture is mixed with the binder system of block 16.

Working Example 3

The material of Examples 1 and 2 is injected into the mold using the apparatus 100 at a pressure of 10 to 70 psi. for 20–40 seconds while keeping the pot at a temperature of approximately 80° C. and the transfer tube and the orifice at a temperature of around 85° C. During the process the mold temperature was kept at the ambient temperature. The mold was then unclamped from the injection molding machine and allowed to cool and the green part extracted.

Working Example 4

The green parts produced in the Working Example 3 were then debinded by placing the parts in a bed of diatomaceous clay at 220° C. for 12 hours to remove the binding system. The diatomaceous clay functions to wick the binder system out of the green part.

Working Example 5

The green articles are sintered following the schedule described in preceding text to achieve full theoretical density of 6.05 gms/cc for yttria stabilized zirconia.

Comparative Example

The compounded mixtures of zirconia alloy and zirconia-alumina composite were injection molded by using a Techno Plas 50 ton injection molding machine. The injection pressure used in the example was approximately 5 Kpsi. The parts contained segregated areas where the binder and the inorganic is particles were not uniform. After debinding and sintering of these parts, the parts were physically distorted, dimensionally inaccurate, and nonuniform in density, and unacceptable for use.

While the invention has been described with a certain degree of particularity, it is manifest that many changes may be made in the details of the construction and the arrangement of components without departing from the spirit and scope of the disclosure. It is understood that the invention is not limited to the embodiments set forth herein for purposes of exemplification, but is to be limited only by the scope of the attached claims, including the full range of equivalency to which each element thereof is entitled.

PARTS LIST:
10 stabilizing zirconia
12 mixing and spray drying
14 agglomeration
16 powder/binder mixing and compounding
18 low pressure injection molding
20 debinding
22 sintering
24 characterization accept/reject
100 apparatus
110 pot
112 mixer
114 transfer tube
116 ball valve
118 port
120 orifice
122 green ceramic article
124 mold
126 lamping cylinder

What is claimed is:

1. A method of injection molding inorganic particles having a size from 0.1 to 0.6 mm comprising the steps of:
   a) spray drying the inorganic particles;
   b) mixing the spray dried inorganic particles with a binder system to form a compounded material, said binder system consisting of organic binder, oleic acid and a linear $C_{11}$, alcohol ethoxylate nonionic surfactant;
   c) injecting the compounded material at a pressure of 10 to 70 psi and an injection temperature of 80° C. to 85° C. into a mold to form a green part;
   d) debinding the green part to remove most of the binder system; and
   e) sintering the debined green part to form the final molded part.

2. A method for injection molding a mixture of fine inorganic particles having a size from 0.1 to 0.6 mm and a coarse inorganic particulate material having a size from 0.5 to 1.5 mm comprising the steps of:
   a) mixing the fine inorganic particles with a coarse inorganic particulate material;
   b) spray drying the fine inorganic particles with the coarse inorganic particulate material with a binding system to form a compounded material; said binder system consisting of organic binder, oleic acid and a linear $C_{11}$ alcohol ethoxylate nonionic surfactant;
   c) mixing the spray dried fine inorganic particles and the coarse inorganic particulate material with a binder system to form a compounded material;
   d) injecting the compounded material at a pressure of 10 to 70 psi and an injection temperature of 80° C. to 85° C. into a mold to form a green part;
   e) debinding the green part to remove most of the binder system; and
   f) sintering the debined green part to form the final molded part.

* * * * *

UNITED STATES PATENT AND TRADEMARK OFFICE
CERTIFICATE OF CORRECTION

PATENT NO. : 6,156,246
DATED : December 5, 2000
INVENTOR(S) : Dilip K. Chatterjee, et al.

It is certified that error appears in the above-identified patent and that said Letters Patent is hereby corrected as shown below:

Column 8, claim 1,
Line 2, delete "0.6 mm" and insert -- 0.6 $\mu$m --.

Claim 2,
Line 2, delete "0.6 mm" and insert -- 0.6 $\mu$m --."

Claim 2,
Line 4, delete "0.6 mm" and insert -- 0.6 $\mu$m --.

Signed and Sealed this

Second Day of October, 2001

*Attest:*

NICHOLAS P. GODICI
*Attesting Officer*     *Acting Director of the United States Patent and Trademark Office*